US011235459B2

(12) United States Patent
Dupuis

(10) Patent No.: US 11,235,459 B2
(45) Date of Patent: Feb. 1, 2022

(54) INVERSE KINEMATIC SOLVER FOR WRIST OFFSET ROBOTS

(71) Applicant: Intrinsic Innovation LLC, Mountain View, CA (US)

(72) Inventor: Jean-Francois Dupuis, San Francisco, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 170 days.

(21) Appl. No.: 16/541,541

(22) Filed: Aug. 15, 2019

(65) Prior Publication Data

US 2021/0046645 A1 Feb. 18, 2021

(51) Int. Cl.
*B25J 9/16* (2006.01)

(52) U.S. Cl.
CPC ........... *B25J 9/1612* (2013.01); *B25J 9/1635* (2013.01); *B25J 9/1664* (2013.01)

(58) Field of Classification Search
CPC ...... B25J 9/1635; B25J 9/1664; B25J 9/1607; B25J 9/1612
See application file for complete search history.

(56) References Cited

U.S. PATENT DOCUMENTS

| 4,999,553 A * | 3/1991 | Seraji ..................... B25J 9/1643 318/628 |
| 5,159,249 A | 10/1992 | Megherbi et al. |
| 5,740,329 A | 4/1998 | Lee et al. |
| 5,887,121 A * | 3/1999 | Funda .................... B25J 9/1648 700/263 |
| 7,180,253 B2 | 2/2007 | Weinhofer et al. |
| 2005/0143860 A1 * | 6/2005 | Nakajima .............. B25J 9/1643 700/245 |

(Continued)

FOREIGN PATENT DOCUMENTS

| CN | 101814194 | 8/2012 |
| CN | 103529856 | 4/2016 |

(Continued)

OTHER PUBLICATIONS

Yu; "An Analytical Solution for Inverse Kinematic of 7-DOF Redundant Manipulators with Offset-Wrist"; Proceedings of 2012 IEEE International Conference on Mechatronics and Automation; 2012; pp. 92-97 (Year: 2012).*

(Continued)

*Primary Examiner* — Stephen Holwerda
(74) *Attorney, Agent, or Firm* — Fish & Richardson P.C.

(57) ABSTRACT

Techniques for controlling a robot are described in this document. In some implementations, a method includes determining a first target position of a first point located at the first end of the first link based on pose data for an end effector of a robot having a wrist offset. A second target position of a first joint connecting the first link to a second link is determined. A third target position of a second joint located at the first end of a third link is determined, including defining a first plane that includes the second target position of the first joint. A position and size of a circle that lies within a second plane is determined. A point on a perimeter (Continued)

of the circle is selected as the third target position. Movement data based on each position of each joint is provided to a control system.

20 Claims, 7 Drawing Sheets

(56) References Cited

U.S. PATENT DOCUMENTS

| | | | | |
|---|---|---|---|---|
| 2012/0239194 | A1* | 9/2012 | Kagawa | B25J 9/1692 |
| | | | | 700/254 |
| 2013/0041509 | A1* | 2/2013 | Saito | B25J 9/047 |
| | | | | 700/261 |
| 2014/0052155 | A1* | 2/2014 | Hourtash | B25J 9/1643 |
| | | | | 606/130 |
| 2014/0074289 | A1* | 3/2014 | Xiao | B25J 9/163 |
| | | | | 700/254 |
| 2014/0257329 | A1 | 9/2014 | Won et al. | |
| 2019/0299416 | A1* | 10/2019 | Watanabe | B25J 9/1607 |
| 2020/0055189 | A1* | 2/2020 | Tsuneta | B25J 9/06 |

FOREIGN PATENT DOCUMENTS

| | | |
|---|---|---|
| CN | 107685330 | 12/2018 |
| JP | 2017131990 | 8/2017 |

OTHER PUBLICATIONS

Luo; "Analytical Inverse Kinematic Solution for Modularized 7-DoF Redundant Manipulators with Offsets at Shoulder and Wrist"; 2014 IEEE/RSJ International Conference on Intelligent Robots and Systems; 2014; pp. 516-521 (Year: 2014).*

Josuet; "An Improved Inverse Kinematics Solution of 6R-DOF Robot Manipulators with Euclidian Wrist Using Dual Quaternions"; Proceedings of 2016 International Automatic Control Conference; 2016; pp. 77-82 (Year: 2016).*

Cao; "Inverse Kinematics of 7-DOF Redundant Manipulators with Arbitrary Offsets Based on Augmented Jacobian"; 33rd Youth Academic Annual Conference of Chinese Association of Automation; 2018; pp. 37-42 (Year: 2018).*

PCT International Search Report and Written Opinion in International Appln. No. PCT/US2020/046217, dated Oct. 27, 2020, 48 pages.

Fu et al, "Solution of inverse kinematics for 6R robot manipulators with offset wrist based on geomatric algebra," in Journal of Mechanisms and Robotics, Aug. 2013, 7 pages.

Kleppe et al, "Inverse Kinematics for Industrial Robots Using Conformal Algebra," in Norwegian Society of Automatic Control, 2016, 13 pages.

Wu et al, "Inverse kinematic of robot manipulators with offset wrist," IEEE Xplore, 2015, 6 pages.

* cited by examiner

INVERSE KINEMATIC SOLVER FOR WRIST OFFSET ROBOTS

TECHNICAL FIELD

This disclosure generally relates to inverse kinematic techniques for controlling the movement of robots that have an offset wrist.

BACKGROUND

In robotics, inverse kinematics can be used to determine the parameters for a robot's joint(s) that provide a desired position for the robot's end effector. An end effector is the device at the end of a robotic arm. There are a number of techniques for solving the inverse kinematics for a robot, including algebraic techniques, iterative techniques, Jacobian inversion techniques, and Jacobian transpose techniques.

SUMMARY

This specification describes systems, methods, devices, and other techniques for determining the joint parameters for a robot with a wrist offset. In general, an inverse kinematic solver can determine the parameters for each joint of the robot for each target pose of an end effector of the robot. For example, a robot can include multiple joints between links of the robot that each provide some degree of motion for the robot. The parameters for a joint can include a position of the joint and an angle of the joint.

To determine the parameters of the joints for a wrist offset robot, the inverse kinematic solver can determine the position and size of a circle based on the geometry of the robot and, more particularly, the geometry of the wrist offset of the robot. The perimeter of the circle can represent candidate positions of one of the joints, e.g., the wrist joint, that may be a valid solution for putting the end effector in the target pose. The inverse kinematic solver can then evaluate each candidate position of this joint to find one or more valid solutions. If there are multiple valid solutions, the inverse kinematic solver can select one of the solutions and provide the joint parameters for the selected solution to a motion controller that controls the motion of the robot. In turn, the motion controller can cause the joints to move into their target positions and angles using the joint parameters.

The techniques described in this document can determine all solutions for a given target pose of an end effector for a wrist offset robot without the need for an initial guess. This can increase the speed at which a valid solution is determined, ensure that a valid solution is determined, and reduce wasted time and processing resources in determining a valid solution.

Some implementations of the subject matter described herein include receiving pose data defining a target pose for an end effector of a robot having a wrist offset, the pose data specifying a target end effector position for the end effector and a target orientation of the end effector, the end effector being attached to a first end of a first link of the robot. A determination is made, based on the pose data, a first target position of a first point located at the first end of the first link. A determination is made, based on the pose data, a second target position of a first joint connecting the first link to a second link, the first joint being located at (i) a second end of the first link opposite the first end and (ii) a first end of the second link, wherein the first link and the second link form an offset wrist connected to a first end of a third link of the robot. A determination is made of a third target position of a second joint located at the first end of the third link, including: defining a first plane that (i) includes the second target position of the first joint and (ii) for which a line between the first target position of the first point and the second target position of the first joint is a normal to the first plane; determining, based at least on a distance between the first joint and the second joint, a position and size of a circle that (i) lies within a second plane that is parallel to the first plane and that is located (ii) at an offset position from the first plane; and selecting, as the third target position of the second joint, a point on a perimeter of the circle. Movement data is provided to the control system of the robot based on each target position for each joint. The movement data causes the control system to adjust links of the robot such that each joint is located at the target position for the joint and the end effector is located at the target end effector position and in the target orientation for the end effector.

These and other implementations can optionally include one or more of the following features. Determining the position and size of the circle can include determining an offset distance between the first plane and the second plane based on the distance between the first joint and the second joint and an angle between the first link and the second link.

Determining the position and size of the circle can include determining a radius of the circle based on the distance between the first joint and the second joint and an angle between the first link and the second link. The circle can have a center that is on the line between the first target position of the first point and the second target position of the first joint.

Selecting, as the third target position of the second joint, a point on a perimeter of the circle can include identifying candidate positions of the third target position of the second joint along the perimeter of the circle, evaluating each candidate position to determine whether the candidate position provides a valid solution for the target pose, and identifying, based on the evaluating, a given candidate position that provides a valid solution for the target pose as the third target position.

Evaluating a candidate position can include determining, for a third joint that connects the third link to a fourth link, one or more positions of the third joint based on candidate position and a position of one or more other joints of the robot. For each of the one or more positions of the third joint, a determination is made of an angle between (i) a line between the position of the third joint and the candidate position and (ii) a line between the candidate position and the second target position of a first joint. A determination is made as to whether the angle matches a link angle between the second link and the third link of the robot. Whenever the angle matches the angle between the second link and the third link of the robot, a determination is made that the candidate position provides a valid solution for the target pose.

Evaluating each candidate position and determining whether the angle matches the angle between the second link and the third link of the robot can include generating, for the candidate positions, a curve that represents the determined angle for each candidate position, determining one or more points on the curve that cross a line that represents the link angle, and determining that the candidate position for each point provides a valid solution for the target pose.

Determining, for a third joint that connects the third link to a fourth link, one or more positions of the third joint based on the candidate position and a position of one or more other joints of the robot can include determining a fourth target position of a fourth joint that also connects the third link to the fourth link and determining a fifth target position of a fifth joint that connects the fourth link to a fifth link of the robot. The fourth target position of the fourth joint can be determined based on the fifth target position of a fifth joint. The one or more other joints can include the fourth joint and the fifth joint.

Various features and advantages of the foregoing subject matter is described below with respect to the figures. Additional features and advantages are apparent from the subject matter described herein and the claims.

DESCRIPTION OF DRAWINGS

Like reference numbers and designations in the various drawings indicate like elements.

DETAILED DESCRIPTION

In general, this document describes systems, methods, devices, and techniques for determining the parameters for joints of a robot and controlling the movement of the robot using the parameters. A robot can include multiple links connected by joints that each provide a range of motion for the robot. The robot can also include an end effector, e.g., a tool, attached to one of the links, e.g., to the end of one of the links. The robot controller can receive data specifying a target pose of the end effector. The data can specify a target position and target orientation of the end effector. The robot controller can determine the parameters for the robot joints, e.g., position and angle, that result in the end effector being in the target pose and cause the joints of the robot to move into the target position and orientation defined by the parameters.

The robot controller uses inverse kinematic techniques that are based on geometric algebra to determine the parameters for the robot joints. Such techniques make use of the intersection of geometric objects, e.g., lines, circles, planes, and spheres, that represent the range of motion of the links of the robot in determining the parameters for the joints of the robots.

Figure 1:
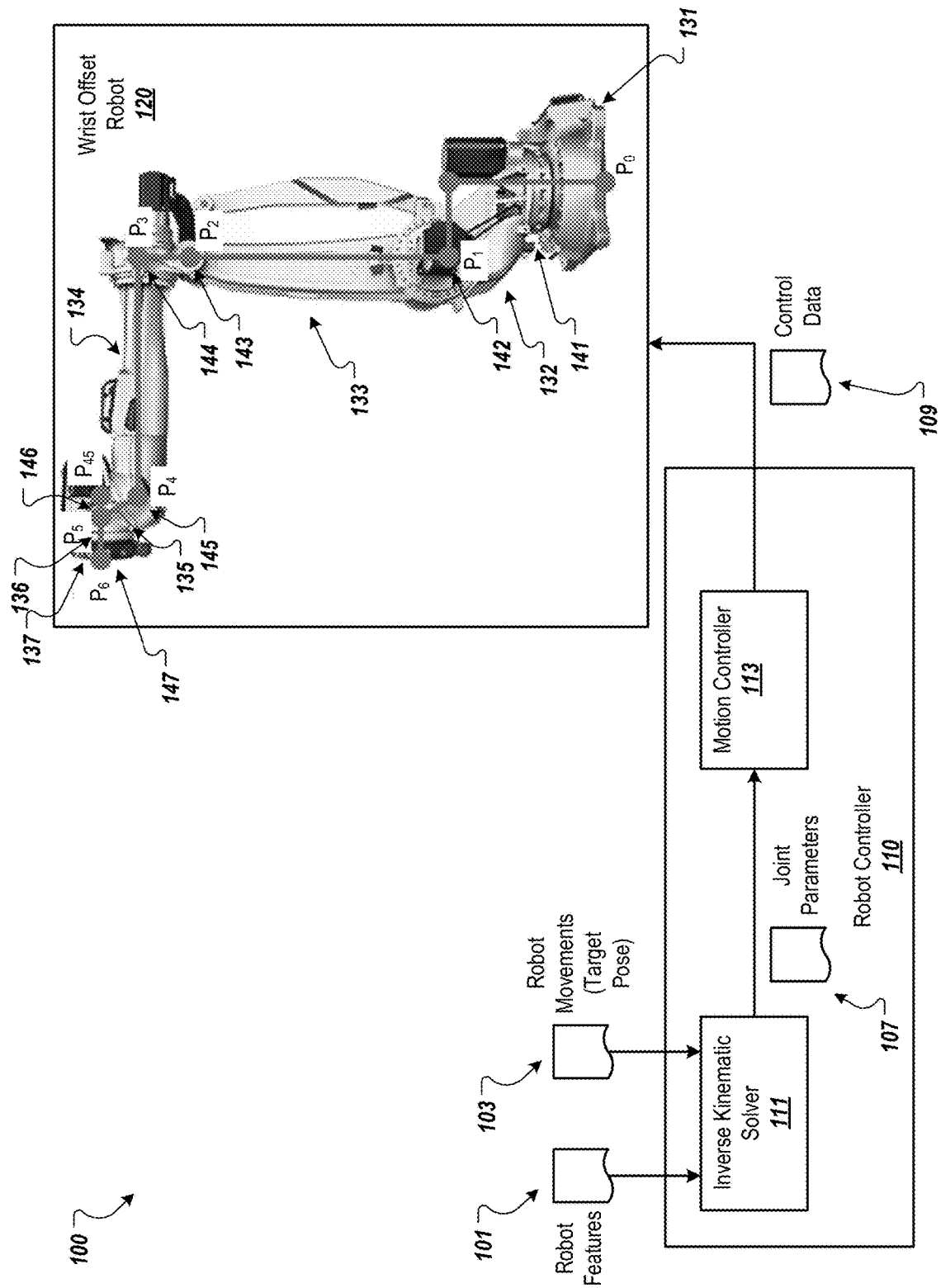
FIG. 1 depicts an example environment in which a robot controller controls movement of a wrist offset robot.

FIG. 1 depicts an example environment 100 in which a robot controller 110 controls movement of a wrist offset robot 120. This example robot 120 is a six degrees of freedom robot arm that it has six single-axis rotational joints 141-146 in the arm. Although the techniques described in this document are largely described in terms of six degrees of freedom robot arms with offset wrists, the techniques can be similarly applied to other robot arms that have an offset wrist.

The robot 120 includes a joint 141 that connects its base 131 to an end of a link 132. This joint 141 can rotate the rest of the arm of the robot 120 about its base 131. The robot 120 also includes a shoulder joint 142 between an end of the link 132 and an end of an upper arm link 133. The shoulder joint 142 connects the link 132 to the upper arm link 133 and moves the rest of the arm above the shoulder joint 142 up and down. The robot 120 also includes an elbow joint 143 between an end of the upper arm link 133 and an end of a forearm link 134. The elbow joint 143 moves the rest of the arm above the elbow joint 143 up and down. The robot 120 also includes a joint 144 above the elbow joint 143. This joint 144 rotates the forearm link 134. The elbow joint 143 and the joint 144 connects the upper arm link 133 to the forearm link 134.

The robot 120 also includes a wrist joint 145 between an end of the forearm link 134 and an end of a wrist offset link 135. The wrist joint 145 connects the forearm link 134 to the wrist offset link 135 and rotates the wrist offset link 135. The wrist offset link 135 connects a wrist link 136 to the joint 145 at the end of the forearm link 134. This wrist offset link 135 creates an offset between wrist link 136 and the forearm link 134. That is, the wrist link 136 is not in line with the forearm link 134 due to the offset provided by the wrist offset link 135.

The robot also includes a joint 146 that connects an end of the wrist link 136 to an end of the wrist offset link 135. The joint 146 rotates the wrist link 136 and the end effector attached to the attachment mechanism 137. At the other end of the wrist link 136, the robot 120 includes a mounting joint 147 and an attachment mechanism 137 for attaching an end effector to that end of the wrist link 136. The end effector can be a gripper, e.g., jaws, claws, magnets, pins, adhesive surfaces, etc., or tools, e.g., screwdriver, wrench, etc., or other appropriate end effector. For example, the robot 120 can be an industrial robot that performs tasks using the end effector.

Each joint 141-146 can include an actuator that moves the links 132-136 into target positions and target orientations based on control data 109 received from the robot controller 109. For example, the actuators can include motors or other sources of energy that cause the links 132-136 to move into the target positions and target orientations.

The robot controller 110 generates the control data 109 based on data specifying target movements 103 of the robot 120. For example, this data 103 can specify a target pose of the end effector attached to the wrist link 136. The data specifying the target pose can include data specifying a position of the end effector and data specifying an orientation of the end effector. The control data 109 specifying target movements 103 can be received from a control system, e.g., a control system that instructs the robot to perform particular tasks. Based on the task, the control system can determine the data specifying target movements 103 and provide the data specifying target movements 103 to the robot controller 110.

Alternatively, the robot controller 110 can determine the one or more target poses of the end effector based on one or more tasks of the robot 120. For example, if the end effector is to move along a particular path, the robot controller 110 can determine the pose of the end effector for multiple points along the particular path.

The robot controller 110 can also generate the control data 109 based on data specifying robot features 101 of the robot. For example, the robot features data 101 can include data specifying the dimensions, e.g., length, width, and/or thickness for each link 132-136 and/or the end effector, the range of motion of each joint 141-146, and the relative geometry of each link 132-136, each joint 141-146, and the end effector.

The robot controller 110 includes an inverse kinematic solver 111 that determines joints parameters 107 for one or more of the joints 141-146 of the robot based on the robot features data 101 and the data specifying target movements 103, e.g., data specifying the target pose of the end effector. The parameters for each joint 141-146 can include a position and an angle. The angle for a joint is the angle between the two links that the joint connects. For example, the angle for the joint 144 is the angle between the forearm link 134 and the upper arm link 133.

The inverse kinematic solver 111 can use conformal geometric algebra techniques to determine the joint parameters for each joint based on the target pose for the end effector. The inverse kinematic solver 111 determines the target position $P_6$ of the mounting joint 147 based on the target pose of the end effector and the dimensions of the end effector. For example, if the end effector is a straight screwdriver, the target position $P_6$ of the mounting joint 147 would be a distance away from the target position of the end of the screwdriver that is equal to (or based on) the length of the screwdriver. The target position $P_6$ of the mounting joint 147 would also be based on the target orientation of the screwdriver as specified by the target pose data. For example, if the target orientation of the screwdriver is to point straight up, the target position $P_6$ of the joint 146 would be directly below the target position of the end of the screwdriver and separated from the target end of the screwdriver by a distance that is equal to (or based on) the length of the screwdriver.

The inverse kinematic solver 111 can determine the target position $P_5$ of the joint 146, e.g., the target position of a point on the joint 146 such as the center of rotation of the joint 146, based on the distance between the mounting joint 147 and the joint 146. For example, this distance may be equal to, or based on, the length of the wrist link 136. The target position $P_5$ of the joint 146 is also based on the target orientation of the end effector. That is, the target position $P_5$ is along an axis that extends from the mounting joint 147, as better described with reference to FIG. 3 below.

The inverse kinematic solver 111 can determine the target position $P_4$ of the joint 145, e.g., the target position of a point on the joint 145 such as the center of rotation of the joint 145, using a circle that is determined based on the geometric relationship between the joints 145 and 146, and the mounting joint 147. For example, the inverse kinematic solver 111 can determine a circle that is centered at point $P_{45}$. The inverse kinematic solver 111 can determine a first plane that includes the target position $P_5$ of the joint 146. The first plane can have a normal vector $P_5P_6$ that extends from the target position $P_5$ of the joint 146 towards the target position $P_6$ of the mounting joint 147, or in the opposite direction. The first plane can also go through target position $P_5$ such that the target position is on the first plane.

The inverse kinematic solver 111 can also determine a second plane that is parallel to the first plane and that includes the point $P_{45}$. The second plane can be offset from the first plane by the distance between the target position $P_5$ of the joint 146 and the point $P_{45}$. The inverse kinematic solver 111 can then determine the size of a circle that is located on the second plane and that has a center as point $P_{45}$. The radius of this circle can be determined using Relationship 1 below:

$$r = P_5 P_4 \sin(\alpha) \qquad \text{Relationship 1:}$$

Figure 3:
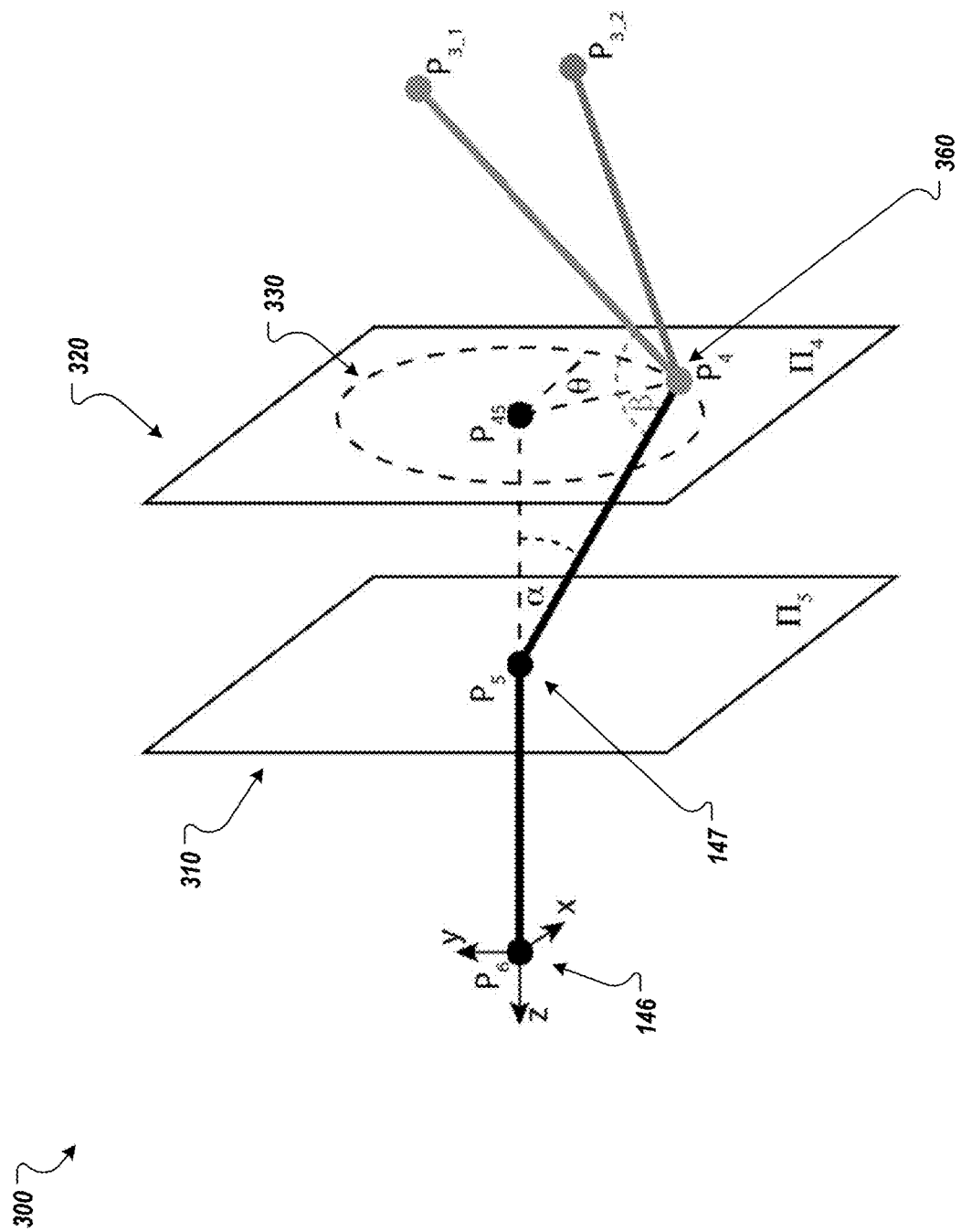
FIG. 3 depicts example geometric relationships between joints of the robot of FIG. 1 and an example circle for determining a position of a joint of the robot of FIG. 1.

In Relationship 1, r is the radius of the circle and $\alpha$ is the angle between a line extending from $P_5$ to $P_{45}$ and a line extending from $P_5$ to $P_4$, as shown in FIG. 3. All solutions for the target position $P_4$ of the joint 145 are on this circle. The inverse kinematic solver 111 can evaluate candidate positions of $P_4$ based on an angle formed by a line between the candidate position of $P_4$ and the target position $P_5$ of the joint 146 and a line between the candidate position of $P_4$ and the target position $P_3$ of the joint 144. This angle is shown in FIG. 3 and described below. If the angle corresponds to the geometry of the robot 120, the candidate $P_4$ is a valid solution. To determine the line between the candidate position of $P_4$ and the target position $P_3$ and use this line to determine whether the angle corresponds to the geometry of the robot 120, the inverse kinematic solver 111 determines the solution(s) for the target position $P_3$ of the joint 144 for the candidate position of $P_4$.

The inverse kinematic solver 111 can use a candidate position $P_4$ and conformal geometric algebra to determine the target positions $P_1$-$P_3$ of each other joint 142-144, respectively. Example inverse kinematic techniques using conformal geometric algebra for robots that do not include a wrist offset are described in "Inverse Kinematics for Industrial Robots Using Conformal Algebra," by Adam L. Kleppe et al., which is incorporated herein by reference. The following description of techniques for determining the joint parameters will be described with reference to FIG. 2, which depicts the joint frames 200 of the robot 120.

In conformal geometric algebra, the 3-dimensional Euclidean space is extended with two orthogonal dimensions. The Euclidean spaces is described with the orthogonal unit vectors, $e_1$, $e_2$, and $e_3$. The vectors a and b in Euclidean space are provided by $a=a_1e_1+a_2e_2+a_3e_3$ and $b=b_1e_1+b_2e_2+b_3e_3$. To obtain the 5-dimensional conformal space, the 3-dimensional Euclidean space is extended with basis vectors $e_+$ and $e_-$ such that $e_+\cdot e_+=1$ and $e_-\cdot e_-=-1$. A multi-vector A in conformal space if a linear combination of the basis elements: $\{1, e_0, e_1, e_2, e_3, e_\infty, e_0e_1, \ldots, e_0e_1e_2e_3e_\infty\}$. The geometric product of two multi-vectors A and B is given by $AB=A\cdot B+A\wedge B$. The Euclidean point p is represented in conformal space by the multi-vector $P=C(p)=p+\frac{1}{2}p^2e_\infty+e_0$.

The input parameters for determining the target positions $P_1$-$P_3$ of each other joint 142-144 are the position vector $p_e$, the approach vector $a_e$, the slide vector $s_e$, and the normal vector $n_3$ of the end effector. The conformal representation of the position vector $p_e$ is given by Relationship 2 below. The vertical plane $\Pi_c$, which is the cross section of the robot through the wrist point, is defined by Relationship 3 below. In Relationship 3, $P_4$ is the candidate position of $P_4$ determined above.

$$P_e = C(p_e) \qquad \text{Relationship 2:}$$

$$\Pi_c = e_0 \wedge e_3 \wedge P_4 \wedge e_\infty \qquad \text{Relationship 3:}$$

The robot 120 can have different configurations that affect how the target positions $P_1$-$P_3$ of the joints 142-144 are determined. A front configuration corresponds to when the front of the robot 120 faces the end effector and a back configuration corresponds when the back of the robot faces the end effector. An elbow up configuration corresponds to when the elbow joint is up and elbow down configuration corresponds to when the elbow joint is down. A wrist flip configuration corresponds to when the wrist link 136 of the robot 120 is flipped and no flip configuration corresponds to when the wrist link 136 of the robot 120 is not flipped. These configurations are selected with the following parameters using Relationships 4-6:

$$\text{Relationship 4: } k_{fb} = \begin{cases} 1 & \text{if front} \\ -1 & \text{if back} \end{cases}$$

$$\text{Relationship 5: } k_{ud} = \begin{cases} 1 & \text{if elbow up} \\ -1 & \text{if elbow down} \end{cases}$$

$$\text{Relationship 6: } k_{fn} = \begin{cases} 1 & \text{if wrist flipped} \\ -1 & \text{if no flip} \end{cases}$$

Figure 2:
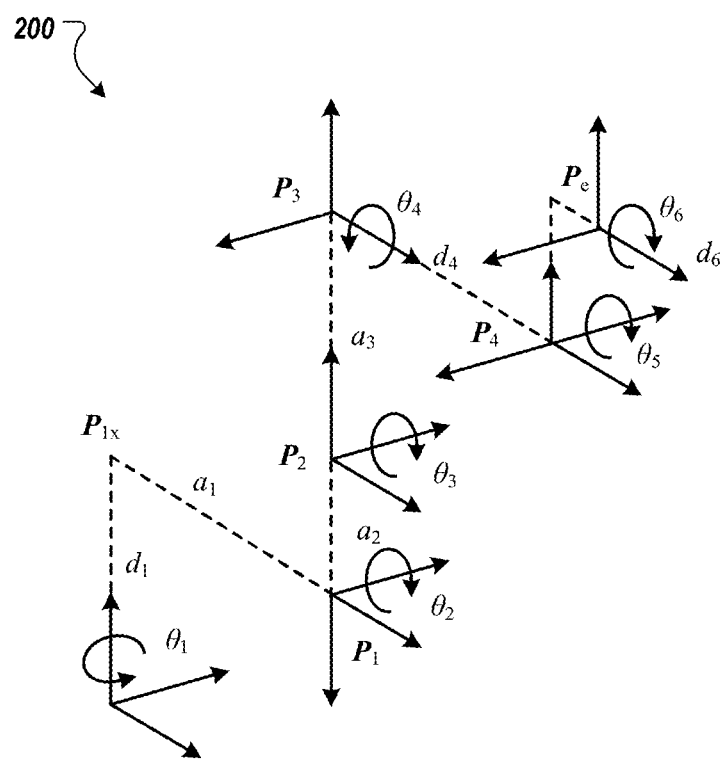
FIG. 2 depicts the joint frames of the robot of FIG. 1.

The target position $P_1$ of the shoulder joint 142 is on a point pair $Q_1$ that can be found by intersecting a sphere with two planes using Relationships 7-10 below. The parameters $d_1$ and $a_1$ are illustrated in FIG. 2. The parameter $d_1$ is the height of the shoulder joint 142 and the parameter $a_1$ is the lateral offset distance that the shoulder joint 142 is offset from the center of the base 131.

$$S^*_0 = e_0 - \tfrac{1}{2}\rho^2 e_\infty \qquad \text{Relationship 7:}$$

$$\rho^2 = d_1^2 + a_1^2 \qquad \text{Relationship 8:}$$

$$\Pi^*_{1x} = e_3 + d_1 e_\infty \qquad \text{Relationship 9:}$$

$$Q_1 = (S^*_0 \hat{} \Pi^*_{1x}) \cdot \Pi_c \qquad \text{Relationship 10:}$$

The point pair $Q_1$ has two possible solutions for the target position $P_1$ of the shoulder joint 142. A first solution corresponds to the front configuration of the robot 120 and the second solution corresponds to the back configuration of the robot 120. The inverse kinematic solver 111 can select the solution for the target position $P_1$ of the shoulder joint 142 using Relationships 11 and 12 below:

$$\text{Relationship 11: } P_{1\pm} = \frac{Q_1 \pm \sqrt{Q_1^2}}{-e_\infty \cdot Q_1}$$

$$\text{Relationship 12: } P_1 = \begin{cases} P_{1+} & \text{if } k_{fb}(P_{1+} \cdot P_e) > k_{fb}(P_{1-} \cdot P_e) \\ P_{1-} & \text{otherwise} \end{cases}$$

The target position $P_2$ for the elbow joint 143 is on a circle $C_2$, which the intersection of two spheres $S^*_1$ and $S^*_w$ defined by Relationships 13 and 14 below:

$$S^*_1 = P_1 - \tfrac{1}{2}a_2^2 e_\infty \qquad \text{Relationship 13:}$$

$$S^*_w = P_w - \tfrac{1}{2}(d_4^2 + a_3^2) e_\infty \qquad \text{Relationship 14:}$$

In Relationships 13 and 14, the sphere $S_1$ has a center point at the selected target position $P_1$ of the shoulder joint 142 and the sphere $S_4$ has a center point of the candidate position of $P_4$ of the wrist joint 145. The intersection of the circle $C_2$ with the vertical plane $\Pi$, will include a point pair $Q_2$ that the inverse kinematic solver 111 finds using Relationships 15 and 16 below:

$$C^*_2 = S^*_1 \hat{} S^*_4 \qquad \text{Relationship 15:}$$

$$Q_2 = C^*_2 \cdot \Pi_c \qquad \text{Relationship 16:}$$

The point pair $Q_2$ has two possible solutions for the target position $P_2$ of the elbow joint 143. The inverse kinematic solver 111 can select the target position $P_2$ of the elbow joint 143 from the two points based on whether the robot 120 will be in the elbow up or elbow down configuration. For example, the inverse kinematic solver 111 can select the target position $P_2$ of the elbow joint 143 using Relationship 17 below:

$$\text{Relationship 17: } P_2 = \frac{Q_2 - k_{ud}\sqrt{Q_2^2}}{-e_\infty \cdot Q_2}$$

The inverse kinematic solver 111 can determine the target position $P_3$ of the joint 144 based on the target position $P_2$ of the elbow joint 143 and the candidate position of $P_4$ of the wrist joint 145. The inverse kinematic solver 111 can determine a point pair $Q_3$ for the target position $P_3$ of the joint 144 using Relationships 18-21 below:

$$S^*_2 = P_2 - \tfrac{1}{2}a_3^2 e_\infty \qquad \text{Relationship 18:}$$

$$K^*_4 = P_4 - (P_2 \cdot S^*_2) e_\infty \qquad \text{Relationship 19:}$$

$$C^*_3 = K^*_4 \hat{} S^*_4 \qquad \text{Relationship 20:}$$

$$Q_3 = C^*_3 \cdot \Pi_c \qquad \text{Relationship 21:}$$

The inverse kinematic solver 111 can then select from the points in the point pair $Q_3$ based on the geometry of the robot 120 and Relationship 22 below:

$$\text{Relationship 22: } \Pi_{2wc} = P_2 \wedge P_4 \wedge \Pi^*_c \wedge e_\infty$$

$$P_3 = \begin{cases} P_{3+} & \text{if } k_{fb} P_{3+} \cdot \Pi^*_{2wc} > 0 \\ P_{3-} & \text{otherwise} \end{cases}$$

Where:

$$P_{3\pm} = \frac{Q_3 \pm \sqrt{Q_3^2}}{-e_\infty \cdot Q_3}$$

Figure 4:
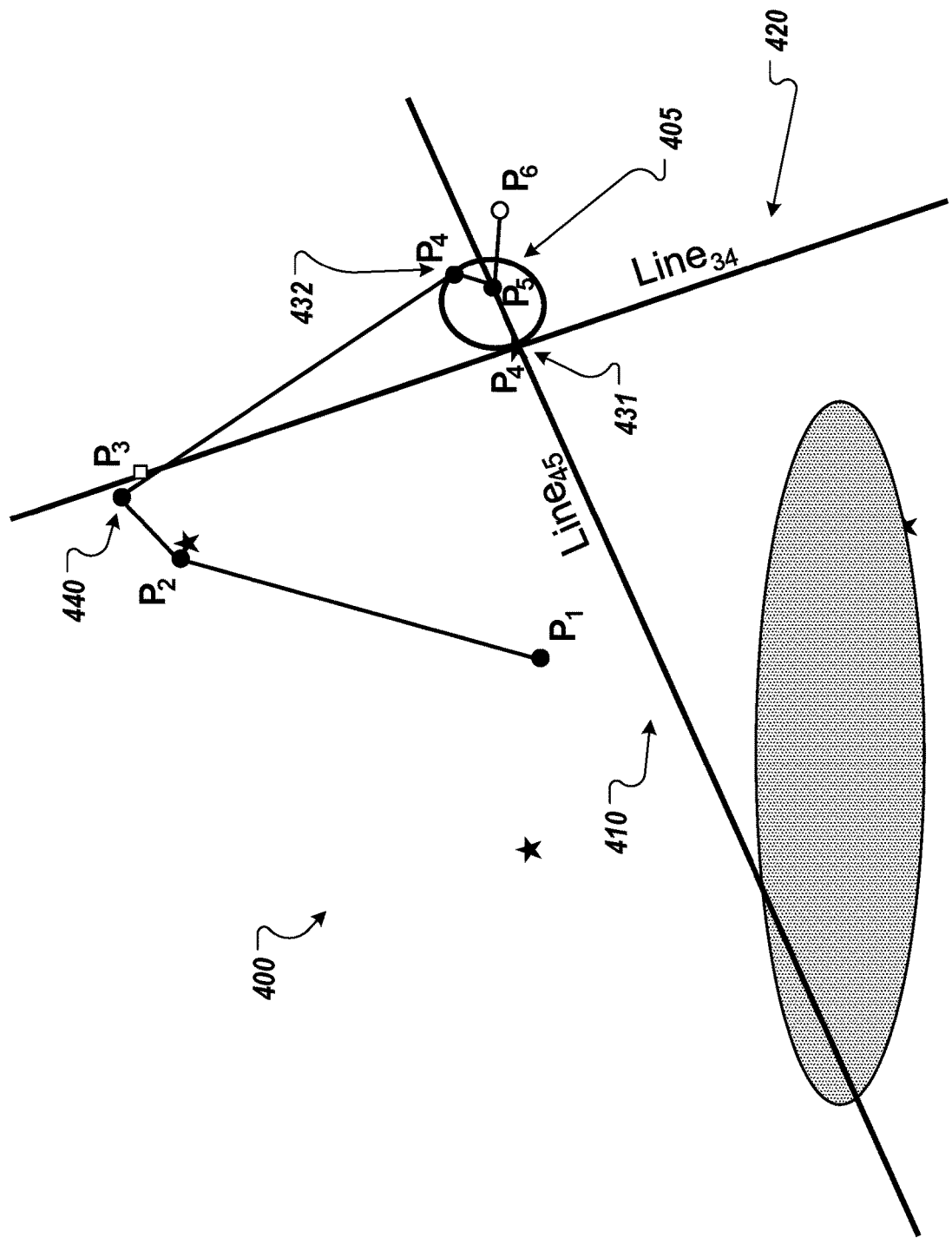
FIG. 4 is a diagram that depicts example solutions for the position of a joint of the robot of FIG. 1.
Figure 5:
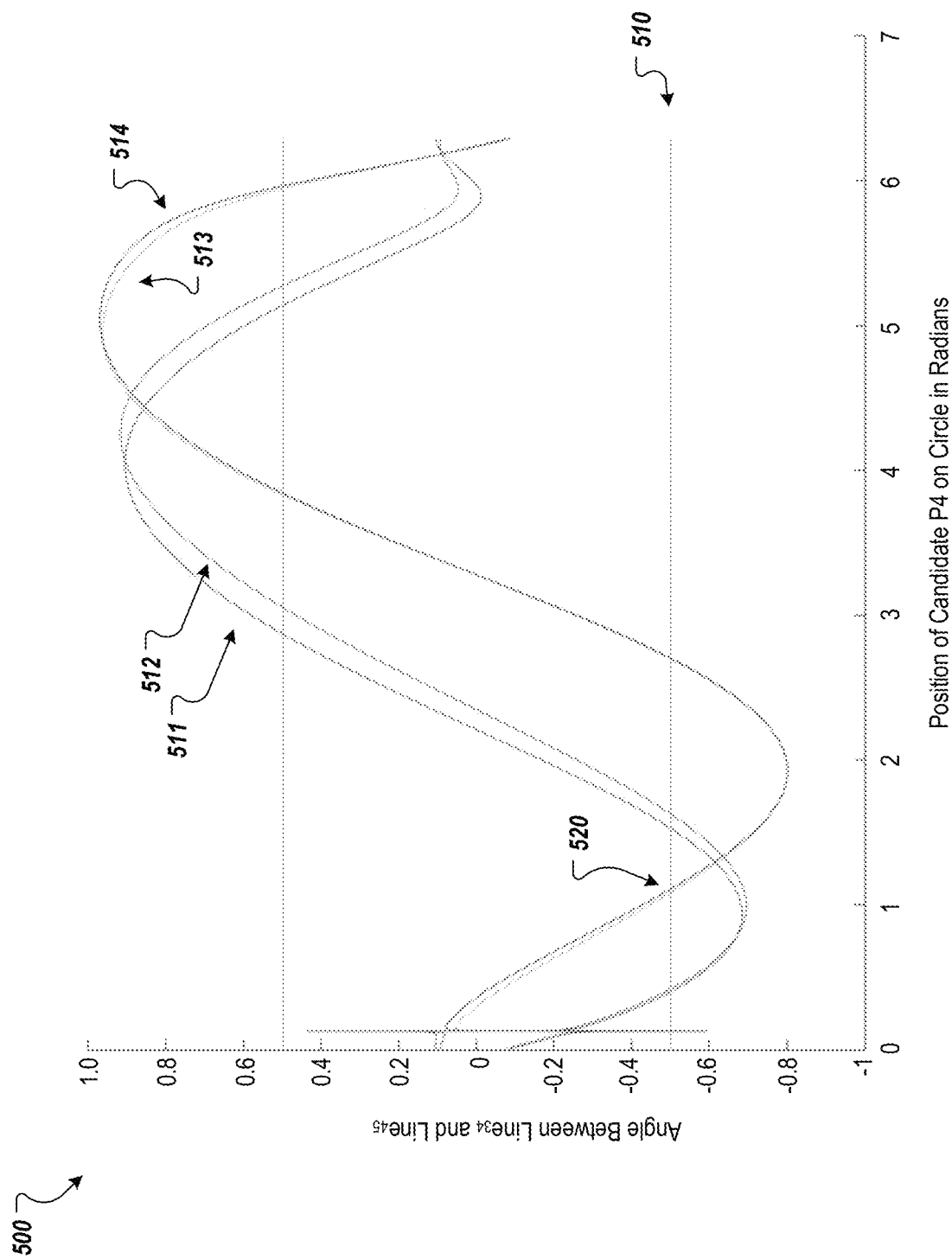
FIG. 5 depicts an example graph of angles between joints of the robot of FIG. 1.

In some implementations, the inverse kinematic solver 111 can evaluate each of four possible solutions to the target position $P_3$ to determine whether the candidate position of $P_4$ of the wrist joint 145 is a valid solution. The four possible solutions include a first point for a first configuration in which the wrist is not flipped and the elbow is up, a second point for a second configuration in which the wrist is not flipped and the elbow is down, a third point for a third configuration in which the wrist is flipped and the elbow is up, and a fourth position in which the wrist is flipped and the elbow is down. The techniques for evaluating each candidate position of $P_4$ and selecting the target position $P_4$ from the candidates is described with reference to FIGS. 1 and 3-5. FIG. 3 depicts example geometric relationships 300 between joints of the robot 120 and an example circle 330 for determining a position $P_4$ of the joint 145 of the robot 120. FIG. 4 is a diagram 400 that depicts example solutions for the position of a joint of the robot 120. FIG. 5 depicts an example graph 500 of angles between joints of the robot of FIG. 1.

Referring to FIG. 3, the plane 310 corresponds to the first plane described above and the plane 320 corresponds to the second plane described above. The inverse kinematic solver 111 can determine the first plane 310 that includes the target position $P_5$ of the joint 146 and the second plane 320 that that is parallel to the first plane 310 and that includes the point $P_{45}$. The inverse kinematic solver 111 also determines the target position $P_5$ of the joint 146 based on the target orientation of the end effector such that the target position is located a distance $P_5P_6$ (distance between the target positions $P_5$ and $P_6$) along the negative z-axis from the end of the wrist link 136, e.g., from the target position $P_6$ of the joint 146.

The inverse kinematic solver 111 can determine the two planes 310 to 320 to determine the location and orientation of a circle 330 that is centered on the point $P_{45}$. Knowing the distance $P_{45}P_5=P_5P_4 \cos(\alpha)$, the second plane 320 can be defined as offset to the first plane 310 by a distance $P_{45}P_5$, which is the distance between point $P_{45}$ and the target position $P_5$ of the joint 136. The distance of $P_5P_4$, e.g., the length of the wrist offset link 135, and the angle $\alpha$ is known based on the geometry of the robot 120. The inverse kinematic solver 111 can determine the location of the point $P_{45}$ as the intersection of the line $P_5P_6$ and the second plane 320. As described above, the inverse kinematic solver 111 can determine the radius, and thus the size, of the circle 330 using Relationship 1 above.

Each candidate position of $P_4$ is on the perimeter of the circle 330. The circle 330 represents the possible locations of the joint 145 if the joint 145 was rotated about the axis defined by the target position $P_5$ and the target position $P_6$, e.g., the axis defined by the wrist link 136 when the wrist link 136 is arranged such that the joint 147 is at target position $P_6$ and the joint 146 is at the target position $P_5$. Thus, the circle 330 represents the possible locations of the target position of $P_4$ when the wrist link 136 is in this position.

One candidate position 350 is illustrated in FIG. 3. The inverse kinematic 111 can evaluate each candidate position along the perimeter of the circle 330 to determine valid solutions for the position $P_4$ of the joint 145. For example, the inverse kinematic solver 111 can iterate over the perimeter of the circle 350 and, for each iteration, evaluate the candidate position of $P_4$ for that iteration. As there may be multiple valid solutions, the inverse kinematic solver 111 can determine each valid solution and select one of the solutions from the multiple valid solutions.

To determine whether a candidate position of $P_4$ is valid, the inverse kinematic solver 111 can determine one or more solutions for the target position $P_3$ of the joint 144, as described above. In this example, two solutions $P_{3\_1}$ and $P_{3\_2}$ are illustrated in FIG. 3. Point $P_{3\_1}$ is a potential solution for the target position $P_3$ of the joint 144 and point $P_{3\_2}$ is a potential solution for the target position $P_3$ of the joint 144. For each solution for the target position $P_3$, the inverse kinematic solver 111 can then determine angle $\beta$ formed by the $Line_{45}$ (the line between the candidate position of $P_4$ and the target position $P_5$) and $Line_{34}$ (the line between the solution for $P_3$ and candidate position of $P_4$) for the candidate position of $P_4$ and the solution for $P_3$. In this example, the angle $\beta$ formed by the $Line_{45}$ and the $Line_{34}$ for the point $P_{3\_1}$.

The inverse kinematic solver 111 can then determine whether the angle $\beta$ for at least one of the solutions for $P_3$ and the candidate position of $P_4$ corresponds to the geometry of the robot 120. That is, the inverse kinematic solver 111 can determine whether the angle $\beta$ matches the angle between the forearm link 134 and the wrist offset link 135 of the robot 120. If so, the candidate position of $P_4$ provides a valid solution. If none of the solutions for $P_3$ corresponds to the geometry of the robot 120, the inverse kinematic solver 111 can determine that the candidate position of $P_4$ does not provide a valid solution.

Referring to FIG. 4, this diagram 400 that depicts example solutions for the position of a joint of the robot of FIG. 1. In particular, the diagram 400 depicts an invalid candidate position of $P_4$ 431 for the joint 145 and a valid candidate position of $P_4$ 432 for the joint 145. Both candidate positions of $P_4$ are on a circle 405 that has a center $P_{45}$ (not shown) and that has been determined using the geometry of the offset wrist formed by the links 134-135 and the joints 145 and 146, as described above.

To determine that the candidate position $P_4$ 431 is invalid, the inverse kinematic solver 111 can determine the angle between $Line_{45}$ 410 and $Line_{34}$ 420 for the candidate position of $P_4$ 431 and a position $P_3$ (e.g., one of four possible positions $P_3$ determined for the candidate position of $P_4$ 431) and compare the determined angle to the corresponding angle of the geometry of the robot 120. In this example, the $Line_{34}$ 420 does not pass through a valid position of $P_3$ 440 due to the angle between the two lines. Thus, the candidate position of $P_4$ 431 for the joint 145 is not valid. In contrast, the line from the candidate position of $P_4$ 432 does pass through a valid position of $P_3$ 440 due to the angle between this line and a line from the candidate of position $P_4$ and $P_5$. Thus, the angle for the candidate position of $P_4$ 432 is valid.

Referring to FIG. 5, this graph 500 depicts angles between joints of the robot 120. In particular, the graph 500 depicts, for a target pose of the end effector of the robot 120, a curve for each of four solutions for the target position $P_3$ of the joint 144 for candidate positions of $P_4$ for the joint 145. The x-axis of the graph 500 represents the 360 degrees in radians (1-6.28) of a circle with a center at $P_{45}$ for the robot. For example, the circle can be the circle 330 of FIG. 3 or the circle 405 of FIG. 4. The inverse kinematic solver 111 can pick a point on the circle to correspond to zero degrees and proceed around the perimeter of the circle in a particular direction (e.g., clockwise of counterclockwise) to identify the candidate positions of $P_4$. The y-axis of the graph 500 represents the angle formed between the $Lines_{34}$ and the $Lines_{45}$ for each of multiple possible solutions.

In particular, each curve 511-514 represents the angle formed between the $Line_{34}$ that extends between (a) the solution for $P_3$ and each candidate position of $P_4$ along the circle and (b) the $Line_{45}$ that extends between the target position $P_5$ of the joint 146 and each candidate position of $P_4$ along the circle. For example, the curve 511 represents angles between the $Lines_{34}$ and the $Lines_{45}$ for one solution to the position $P_3$ and each candidate position of $P_4$ along a circle. As the candidate position of $P_4$ changes around the circle, the angle between the two lines also changes, as shown by the graph 500. For the curve 511, the position $P_3$ is constant for that solution. Each other curve 512-513 represents similar angles for different solutions for $P_3$.

The graph 500 includes a line 510 that represents the valid angle for the robot 120. This valid angle is the angle between the forearm link 134 and the wrist offset link 135 of the robot 120 and be determined based on the geometry off the robot 120 or specified by the manufacturer of the robot 120. The point at which each curve crosses this line is a valid solution for the positions $P_3$ and $P_4$. For example, the curves 513 and 514 both have a valid solution in the area marked by reference numeral 520. In this example, a position of $P_4$ at approximately 1.1 radians along the circle is valid for the position $P_3$ represented by the curve 514 and for the position $P_3$ represented by the curve 514.

The inverse kinematic solver 111 can use a zero-crossing technique to determine which solutions cross the line 510. This technique can use the line 510 as the zero crossing. Using the zero-crossing technique, the inverse kinematic solver 111 can determine the point(s) at which each curve 511-514 cross the line 510 and, for each such point, the position of the candidate $P_4$ that corresponds to the point. The position $P_3$ is known based on the curve that crosses the line 510 at that point as the position $P_3$ for a curve is constant and corresponds to one of the determined solutions for $P_3$.

The granularity at which the inverse kinematic solver 111 traverses the circle can be adjustable. For example, the inverse kinematic solver 111 can evaluate a candidate position of $P_4$ at each degree, e.g., 0, 1, 2, . . . 360, at fractions of degrees, or another appropriate granularity. In some implementations, the inverse kinematic solver 111 can use a more coarse granularity, e.g., every 10 degrees or every 20 degrees. If the inverse kinematic solver 111 determines that a curve crossed the line 510 between two candidate positions of $P_4$, the inverse kinematic solver 111 can evaluate more candidate positions of $P_4$ between the two candidate positions of $P_4$ until the candidate position of $P_4$ at which the angle is valid (e.g., where the curve crosses the line 510) is found. For example, the inverse kinematic solver 510 can use a finer grain granularity when searching between the two candidate positions of $P_4$ than when traversing the circle. In this way, the inverse kinematic solver 111 can find the valid positions of $P_4$ quicker and using less computing resources as the inverse kinematic solvers 111 is evaluating fewer candidate positions of $P_4$.

In this example, there are multiple different valid solutions for $P_4$ and $P_3$ for the target pose of the end effector. The inverse kinematic solver 111 (or another component such as the motion controller 113) can select one of the solutions using optimization criteria. The optimization criteria can include contextual criteria related to obstacles with which the robot 120 might collide when moving and/or historical criteria related to one or more previous configurations of the robot 120. For example, the motion controller 113 can select a valid solution that best avoids obstacles when moving from a current configuration of the robot to the new configuration defined by the valid solution. In another example, the motion controller 113 can select the valid solution that is closest to the current configuration of the robot 120, e.g., that results in the least amount of movement of the end effector or wrist joint.

After selecting the target position $P_4$ of the joint 145 and its corresponding solution for the position $P_3$ of the joint 144, the inverse kinematic solver 111 can use the corresponding target positions $P_1$, $P_2$, $P_5$, and $P_6$ for the joints 142, 143, 146, and 147. As described above, the inverse kinematic solver 111 determines the target positions $P_5$ and $P_6$ are determined based on the target position and the target orientation of the end effector. The inverse kinematic solver 111 determines the target positions $P_1$ and $P_2$ for each candidate position of $P_4$ when evaluation the candidate. If the candidate position of $P_4$ is selected, the target positions $P_1$ and $P_2$ that were determined during the evaluation of the candidate can be used by the robot controller 110 to put the robot 120 in the target pose.

The inverse kinematic solver 110 also determines the angles of the joints 141-146. The inverse kinematic solver 110 can determine the angles based on the rotational plane of each joint 141-146. For example, the inverse kinematic solver 110 can determine the angles based on vectors defining the rotation of the joints 141-146. The point $P_{1x} = C$ $(d_1 e_3)$, Relationships 23-28, and Table 1 can be used to determine the angles.

$$L_{1 \times 1} = P_{1x} \hat{} P_1 \hat{} e_\infty \qquad \text{Relationship 23:}$$

$$L_{12} = P_1 \hat{} P_2 \hat{} e_\infty \qquad \text{Relationship 24:}$$

$$L_{34} = P_3 \hat{} P_4 \hat{} e_\infty \qquad \text{Relationship 25:}$$

$$L_{4e} = P_4 \hat{} P_e \hat{} e_\infty \qquad \text{Relationship 26:}$$

Referring back to FIG. 2, the rotation place for $\theta_1$, which is the rotation of the joint 141, is $\hat{N}_{74_1} = e_1 \hat{} e_2$. This rotation plane is the horizontal base plane for the robot 120. The inverse kinematic solver 111 can determine the rotation planes for $\theta_2$ and $\theta_3$ using the vertical plane $\Pi_c$ and Relationship 27 below:

$$\text{Relationship 27: } \hat{N} = -\frac{(\Pi_c \cdot e_0) \cdot e_\infty}{\|(\Pi_c \cdot e_0) \cdot e_\infty\|}$$

The rotation plane for $\theta_2$ is the rotation plane for the joint 141 and the rotation plane for $\theta_3$ is the rotation plane for the joint 143. The inverse kinematic solver 111 can determine the rotation plane for the joint $\theta_4$, which is the rotation plane for the joint 144, using $L_{34}$ and Relationship 24 below. In Relationship 24, the parameter $L^*$ is equal to $L_{34}$.

$$\text{Relationship 28: } \hat{N} = -\frac{(L^* \wedge e_\infty) \cdot e_0}{\|(L^* \wedge e_\infty) \cdot e_0\|}$$

The rotation plane for $\theta_5$, which is the rotation plane for the joint 145, is parallel to the plane $L_{34} \hat{} P_e$. The rotation plane for $\theta_5$ also depends on whether the wrist is flipped, e.g., $k_{fn}$. The rotation plane for $\theta_6$, which the rotation plane for the joint 146, is $-a_e^+$. The inverse kinematic solver 111 can generate the joints angles for the joints 141-146 using the parameters provided in Table 1 below:

TABLE 1

| $\theta_i$ | $a_{\theta_i}$ | $b_{\theta_i}$ | $N_{\theta_i}$ | offset |
|---|---|---|---|---|
| 1 | $k_{fb} \Pi_c^*$ | $-e_2$ | $e_1 \wedge e_2$ | 0 |
| 2 | $(L_{1 \times 1} \cdot e_0) \cdot e_\infty$ | $(L_{12} \cdot e_0) \cdot e_\infty$ | $k_{fb}(\Pi_c \cdot e_0) \cdot e_\infty$ | 0 |
| 3 | $(L_{12} \cdot e_0) \cdot e_\infty$ | $(L_{12} \cdot e_0) \cdot e_\infty$ | $k_{fb}(\Pi_c \cdot e_0) \cdot e_\infty$ | $-\frac{\Pi}{2}$ |
| 4 | $-\Pi_c^*$ | $-k_{fb}k_{fn}((L_{34} \wedge P_e)^* \wedge e_0) \cdot e_\infty$ | $(L_{34}^* \wedge e_0) \cdot e_\infty$ | 0 |
| 5 | $(L_{4e} \cdot e_0) \cdot e_\infty$ | $(L_{34} \cdot e_0) \cdot e_\infty$ | $k_{fn}((L_{34} \wedge P_e) \cdot e_0) \cdot e_\infty$ | 0 |
| 6 | $((L_{3w} \wedge P_e)^* \wedge e_0) \cdot e_\infty$ | $-s_e$ | $-a_e^+$ | 0 |

Referring back to FIG. 1, the inverse kinematic solver 111 can provide, as the joint parameters 107 for the joints 141-146, the determine target position $P_1$-$P_6$ and the determined joints angles to a motion controller 113 of the robot controller 110. The motion controller 113 can then provide control data to each joint 141-146 that causes the joints 141-146 to move into their respective target positions and angles. The control data 109 can include data specifying one or more joint parameters for the joint. For example, the control data 109 for a joint 141-149 can include a series of positions and angles of the joint 141-149 and the joint 141-149 can use the control data 109 to move between the series of positions to the target position for the joint 141-149.

In some implementations, the motion controller 113 can receive the data specifying target movements 103 of the robot 120. Using this data, the motion controller 113 can query the inverse kinematic solver 111 for the joint parameters for each joint 141-149. The inverse kinematic solver 111 can determine the joint parameters as described above and provide the joint parameters 107 to the motion controller 113.

Figure 6:
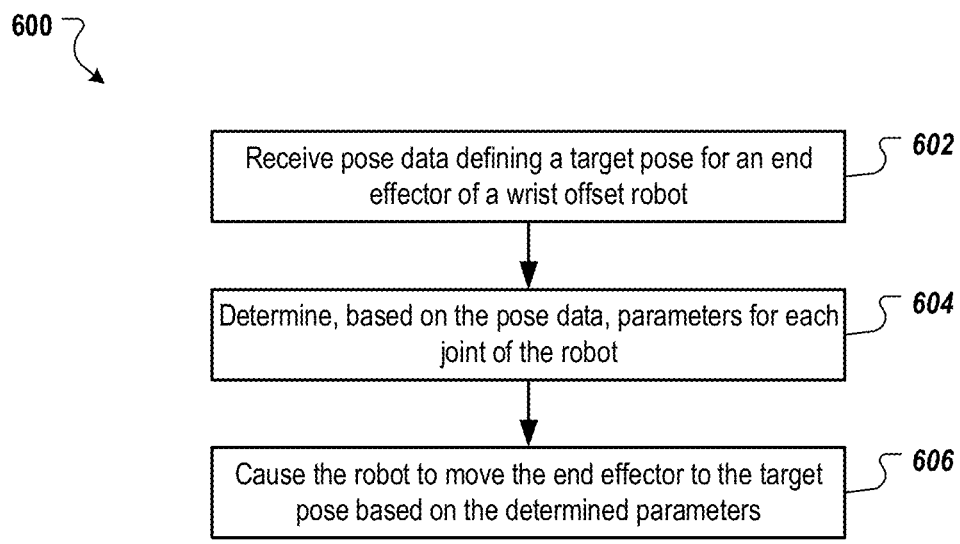
FIG. 6 depicts a flow diagram of an example process for determining parameters of joints of a robot and controlling movement of the robot using the parameters.

FIG. 6 depicts a flow diagram of an example process 600 for determining parameters of joints of a robot and controlling movement of the robot using the parameters. Operations of the process 600 can be implemented, for example, by one or more data processing apparatus. For example, operations of the process 600 can be implements by the robot controller 110 of FIG. 1.

Pose data defining a target pose of an end effector of a wrist offset robot is received (602). The pose data can specify a target end effector position for the end effector and a target orientation of the end effector. The end effector can be attached to an end of a link of the robot. For example, the end effector can be attached to an end of a wrist link of the robot. The wrist link can be offset from a forearm link of the robot, e.g., using a wrist offset link. The robot can be a six degrees of freedom robot arm that it has six single-axis rotational joints.

Parameters for each joint of the robot are determined (604). The parameters can include a position of the joint and an angle of the joint. As described above, the parameters can be determined using conformal geometric algebra techniques based on the geometry of the robot and the pose data for the end effector.

In particular, a set of candidate positions of a wrist joint for the robot can be determined based on the geometry of the offset wrist of the robot and the pose data for the end effector. The candidate positions can be points on a circle that is determined based on the geometry of the offset wrist and the pose data for the end effector, as described above. For each candidate position of the wrist joint, the position of a shoulder joint and the position of an elbow joint can be determined. In addition, one or more positions of a joint between the elbow joint and the wrist joint can be determined.

Valid solutions of the candidate positions of the wrist joint are determined based on the one or more positions of the joint between the elbow joint and the wrist joint and the geometry of the robot. For example, an angle can be determined between (a) a line that extends between the candidate position of the wrist joint and the solution for the joint between the elbow joint and the wrist joint and (b) a line that extends between the candidate position of the wrist joint and a joint at the other end of the wrist offset link opposite the end at which the wrist joint is located. If this angle matches a valid angle for the geometry of the robot, the solution that corresponds to the angle is determined to be valid. The angles for the joints can be determined based on the positions of the joints that correspond to a valid solution, as described above. An example process for determining the joint parameters is illustrated in FIG. 7 and described below.

The robot is caused to move the end effector to the target pose based on the determined joint parameters (606). For example, control data can be sent to an actuator for each joint. The actuator for each joint can cause the joint to move into the position specified by the control data and to have the angle specified by the control data.

Figure 7:
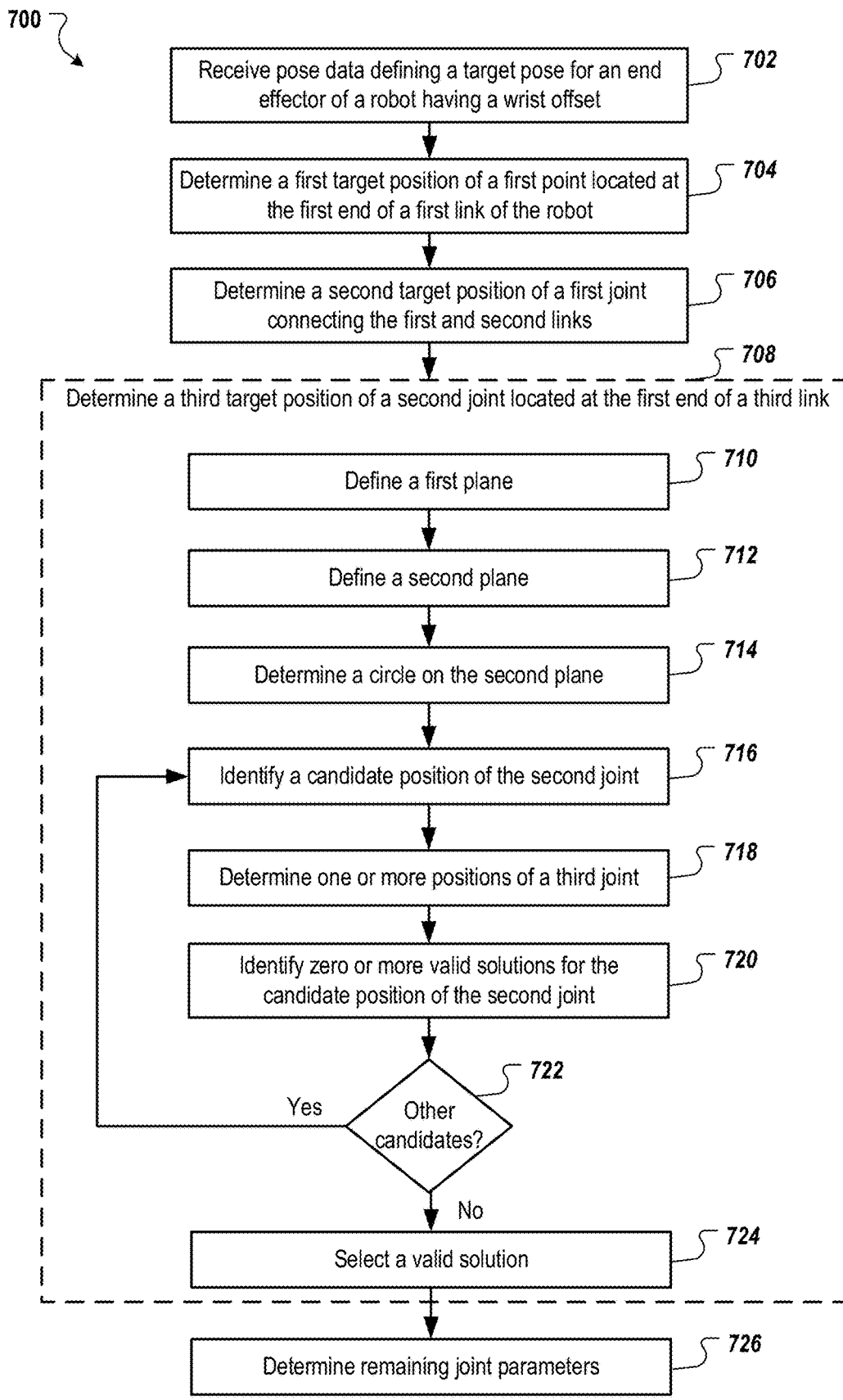
FIG. 7 depicts a flow diagram of an example process for determining parameters of joints of a robot.

FIG. 7 depicts a flow diagram of an example process 700 for determining parameters of joints of a robot. Operations of the process 600 can be implemented, for example, by one or more data processing apparatus. For example, operations of the process 700 can be implements by the robot controller 110 of FIG. 1. The example process 700 is described with reference to the robot 120 of FIG. 1. However, the example process 700 can be used to determine the joint parameters for other wrist offset robots.

Pose data is received (702). The pose data can specify a target end effector position for the end effector and a target orientation of the end effector. The end effector can be attached to an end of a link of the robot 120. For example, the end effector can be attached to an end of a wrist link 136 of the robot 120. The wrist link 136 can be offset from a forearm link 134 of the robot, e.g., using a wrist offset link 135. The robot 120 can be a six degrees of freedom robot arm that it has six single-axis rotational joints.

A first target position of a first point located at the first end of a first link of the robot is determined (702). For example, the first link can be the wrist link 136 that includes a first end and a second end opposite the first end. The first end can include an attachment mechanism 137 for attaching an end effector to the first end. The first point located at the first end of the first link 136 can be a mounting point $P_6$, e.g., located in the middle of the first end of the first link 136 or another appropriate point at the first end of the first link 136.

The first target position $P_6$ of the first point located at the first end of the first link 136 can be determined based on the received pose data and the dimensions of the end effector. For example, the first target position $P_6$ can be offset from the target position of the end effector a distance that is equal to a distance between the target position of the end effector and the point on the end effector that attaches to, or is flush with, the attachment mechanism. The first target position $P_6$ of the first link 136 can also be offset from the target position of the end effector in a direction that is opposite a direction in which the end effector is oriented. For example, if the end effector is a screwdriver that is point in a particular direction, the first target position $P_6$ of the first link 136 can be offset from the target position of the end effector in an opposite direction from the direction in which the screwdriver is to point.

A second target position of a first joint connecting the first and second links is determined (706). For example, the second end of the first link 136 can be attached to a first joint. The first joint can be the joint 146. The first joint 146 attaches the second end of the first link 136 to a first end of a second link. The second link can be the wrist offset link 135. The first joint 146 can rotate the first link 136 and therefore the end effector attached to the first link 136.

The second target position of the first joint can be a point on the first joint 146, e.g., the center of rotation the first joint 146. For example, the second target position of the first joint 146 can be target position $P_5$ of the first joint 146. The second target position $P_5$ of the first joint 146 can be determined based on the first target position $P_6$ of the first link 136 and a distance between the first end of the wrist link 136 (or the mounting point at the first end) and the point on the first joint 146. As described above with reference to FIG. 3, the first target position $P_5$ of the first joint can be located in along the negative z-axis from the end effector. Thus, the second target position $P_5$ of the first joint 146 can be along the negative z-axis and a distance from the first target position $P_6$ of the first link 136.

A third target position of a second joint located at the first end of a third link is determined (708). The second joint can attach the second link 135 to a third link, e.g., the forearm link 134. For example, the second joint can be the wrist joint 145. The second joint 145 can rotate the offset wrist that includes the second link 135 and the first link 136. The third target position of the second joint 145 can be the target position $P_4$. The third target position $P_4$ of the second joint 145, which can be at the center of rotation of the second joint 145, can be determined using constituent operations 710-724.

A first plane is defined (710). The first plane can include the second target position $P_5$ of the first joint 146. A line between the first target position $P_6$ of the first point located at the first end of the first link 136 and the second target position $P_5$ of the first joint 146 is a normal to the first plane. For example, as described above, the first plane can have a normal vector $P_5P_6$ that extends from the target position $P_5$ of the joint 146 towards the target position $P_6$ of the mounting joint 147, or in the opposite direction. The first plane can also go through the second target position $P_5$ such that the second target position $P_5$ is on the first plane.

A second plane is defined (712). The second plane can be that is parallel to the first plane. The second plane can also be located at an offset position from the first plane. As described above, the second plane can be offset from the first plane by the distance between the second target position $P_5$ of the first joint 146 and a point $P_{45}$. The offset distance can be equal to $P_5P_4 \cos(\alpha)$, wherein $P_5P_4$ is the distance between the first joint 146 and the second joint 145 and the angle $\alpha$ is the angle between the normal to the first plane and a line from the first joint 146 to the second joint 146. As shown in FIG. 3, the second plane can be offset in the negative z direction from the first plane.

A position and size of a circle on the second plane is determined (714). The center of the circle can be as point $P_{45}$. The radius of the circle can be determined using Relationship 1 above. As described above, each candidate target position of the second joint is on the perimeter of this circle.

A candidate position of the third target position $P_4$ of the second joint 145 is identified (716). The candidate position can be a position on the circle. For example, each of multiple points of on the perimeter of the circle can be identified and evaluated, e.g., one at a time or in parallel. The first candidate position can be identified at a particular point on the circle, e.g., a point defined as zero degrees on the circle or another appropriate point on the perimeter of the circle.

One or more positions of a third joint are determined based on the candidate position of the third target position $P_4$ of the second joint 145 (718). The third joint can be a joint that connects the third link 134 to a fourth link. For example, the fourth link can be the upper arm link 133 and the third joint can be the elbow joint 144. To determine the position(s) of the third joint, the target positions of a fourth joint and a fifth joint can be found. The fourth joint can be the joint 143 and the fifth joint can be the shoulder joint 142. The target position $P_1$ of the fifth joint 142 can be determined using Relationships 7-12, as described above. Similarly, the target position $P_2$ of the fourth joint 143 can be determined using Relationships 13-17, as described above.

The position(s) $P_3$ of the third joint 144 can be determined based on the target position $P_2$ of the fourth joint 143 and the candidate position of the third target position $P_4$ of the second joint 145. For example, the position(s) $P_3$ of the third joint 144 can be determined using Relationships 18-22, as described above.

Zero or more valid solutions are determined for the candidate position of the third target position $P_4$ of the second joint 145 (720). For each determined position of the third joint 144, an angle between (a) a line between the determined position of the third joint 144 and the candidate position of the third target position $P_4$ of the second joint 145 and (b) a line between the candidate position of the third target position $P_4$ of the second joint 145 and the second target position $P_5$ of the first joint 146 is determined. A determination is then made whether the angle matches the geometry of the robot 120. For example, a determination is made whether the angle matches the angle between the forearm link 134 and the wrist offset link 135. If the angles match, the solution is valid. If the angles do not match, the solution is invalid. As described above, a zero cross technique can be used to identify valid solutions.

A determination is made whether there are remaining candidate positions of the third target position $P_4$ of the second joint 145 to be evaluated (722). If so, the process 700 returns to operation 716 where another candidate is identified for evaluation.

A valid solution is selected (724). For example, multiple candidate positions of the third target position $P_4$ of the second joint 145 can have one or more valid solutions. One of the valid solutions can be selected for use in controlling the robot 120, e.g., using additional criteria as described above.

The remaining joint parameters are determined (726). For the selected valid solution, the target positions for the joints that correspond the valid solution can be determined. For example, the target position $P_1$ of the sixth joint 142 and the target position $P_2$ of the fifth joint 143 that were used to determine the valid target position of $P_3$ of the third joint 144 and the valid target position $P_4$ of the of the second joint 145 can be used as parameters for the sixth joint 142 and the fifth joint 143, respectively. Similarly, the valid solutions for the positions $P_3$ and $P_4$ of the third joint 144 and the second joint 145 can be used as parameters for the third joint 144 and the second joint respectively. The first target position $P_5$ of the first joint 146 can be used as a parameter for the first joint 146. In addition, the angles for the joints can be determined using Relationships 23-28 and Table 1, as described above.

The parameters for the joints can then be used to control the robot. For example, a motion controller can use the target positions and target angles for each joint to cause the joints to move into the target positions and angles, e.g., by generating control data and sending the control data to actuators of the joints.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by one or more data processing apparatus, the method comprising:
   receiving pose data defining a target pose for an end effector of a robot having a wrist offset, the pose data specifying a target end effector position for the end effector and a target orientation of the end effector, the end effector being attached to a first end of a first link of the robot;
   determining, based on the pose data, a first target position of a first point located at the first end of the first link;
   determining, based on the pose data, a second target position of a first joint connecting the first link to a second link, the first joint being located at (i) a second end of the first link opposite the first end and (ii) a first end of the second link, wherein the first link and the second link form an offset wrist connected to a first end of a third link of the robot;
   determining a third target position of a second joint located at the first end of the third link, including:
      defining a first plane (i) that includes the second target position of the first joint and (ii) for which a line between the first target position of the first point and the second target position of the first joint is a normal to the first plane;
      determining, based at least on a distance between the first joint and the second joint, a position and size of a circle (i) that lies within a second plane that is parallel to the first plane and (ii) that is located at an offset position from the first plane; and
      selecting, as the third target position of the second joint, a point on a perimeter of the circle; and
   providing, to a control system of the robot and based on each target position for each joint, movement data that causes the control system to adjust links of the robot such that each joint is located at the target position for the joint and the end effector is located at the target end effector position and in the target orientation for the end effector.

2. The method of claim 1, wherein determining the position and size of the circle comprises determining an offset distance between the first plane and the second plane based on the distance between the first joint and the second joint and an angle between the first link and the second link.

3. The method of claim 1, wherein determining the position and size of the circle comprises determining a radius of the circle based on the distance between the first joint and the second joint and an angle between the first link and the second link.

4. The method of claim 1, wherein the circle has a center that is on the line between the first target position of the first point and the second target position of the first joint.

5. The method of claim 1, wherein selecting, as the third target position of the second joint, a point on a perimeter of the circle comprises:
   identifying a plurality of candidate positions of the third target position of the second joint along the perimeter of the circle;
   evaluating each candidate position to determine whether the candidate position provides a valid solution for the target pose; and
   identifying, based on the evaluating, a given candidate position that provides a valid solution for the target pose as the third target position.

6. The method of claim 5, wherein evaluating a candidate position comprises:
   determining, for a third joint that connects the third link to a fourth link, one or more positions of the third joint based on the candidate position and a position of one or more other joints of the robot; and
   for each of the one or more positions of the third joint:
      determining an angle between (i) a line between the position of the third joint and the candidate position and (ii) a line between the candidate position and the second target position of a first joint;
      determining whether the angle matches a link angle between the second link and the third link of the robot; and
      whenever the angle matches the angle between the second link and the third link of the robot, determining that the candidate position provides a valid solution for the target pose.

7. The method of claim 6, wherein evaluating each candidate position and determining whether the angle matches the angle between the second link and the third link of the robot comprises:
   generating, for the plurality of candidate positions, a curve that represents the determined angle for each candidate position;
   determining one or more points on the curve that cross a line that represents the link angle; and
   determining that the candidate position for each point provides a valid solution for the target pose.

8. The method of claim 5, wherein determining, for a third joint that connects the third link to a fourth link, one or more positions of the third joint based on the candidate position and a position of one or more other joints of the robot comprises:
   determining a fourth target position of a fourth joint that also connects the third link to the fourth link; and
   determining a fifth target position of a fifth joint that connects the fourth link to a fifth link of the robot, wherein the fourth target position of the fourth joint is determined based on the fifth target position of a fifth joint, wherein the one or more other joints comprises the fourth joint and the fifth joint.

9. A system, comprising:
   one or more data processing apparatus; and
   one or more computer-readable media storing instructions that, when executed by the one or more data processing apparatus, cause the one or more data processing apparatus to perform operations comprising:
      receiving pose data defining a target pose for an end effector of a robot having a wrist offset, the pose data specifying a target end effector position for the end effector and a target orientation of the end effector, the end effector being attached to a first end of a first link of the robot;
      determining, based on the pose data, a first target position of a first point located at the first end of the first link;
      determining, based on the pose data, a second target position of a first joint connecting the first link to a second link, the first joint being located at (i) a second end of the first link opposite the first end and (ii) a first end of the second link, wherein the first link and the second link form an offset wrist connected to a first end of a third link of the robot;
      determining a third target position of a second joint located at the first end of the third link, including:
         defining a first plane (i) that includes the second target position of the first joint and (ii) for which a line between the first target position of the first point and the second target position of the first joint is a normal to the first plane;
         determining, based at least on a distance between the first joint and the second joint, a position and size of a circle (i) that lies within a second plane that is parallel to the first plane and (ii) that is located at an offset position from the first plane; and
         selecting, as the third target position of the second joint, a point on a perimeter of the circle; and
      providing, to a control system of the robot and based on each target position for each joint, movement data that causes the control system to adjust links of the robot such that each joint is located at the target position for the joint and the end effector is located at the target end effector position and in the target orientation for the end effector.

10. The system of claim 9, wherein determining the position and size of the circle comprises determining an offset distance between the first plane and the second plane based on the distance between the first joint and the second joint and an angle between the first link and the second link.

11. The system of claim 9, wherein determining the position and size of the circle comprises determining a radius of the circle based on the distance between the first joint and the second joint and an angle between the first link and the second link.

12. The system of claim 9, wherein the circle has a center that is on the line between the first target position of the first point and the second target position of the first joint.

13. The system of claim 9, wherein selecting, as the third target position of the second joint, a point on a perimeter of the circle comprises:
   identifying a plurality of candidate positions of the third target position of the second joint along the perimeter of the circle;
   evaluating each candidate position to determine whether the candidate position provides a valid solution for the target pose; and identifying, based on the evaluating, a given candidate position that provides a valid solution for the target pose as the third target position.

14. The system of claim 13, wherein evaluating a candidate position comprises:
   determining, for a third joint that connects the third link to a fourth link, one or more positions of the third joint based on the candidate position and a position of one or more other joints of the robot; and
   for each of the one or more positions of the third joint:
      determining an angle between (i) a line between the position of the third joint and the candidate position and (ii) a line between the candidate position and the second target position of a first joint;
      determining whether the angle matches a link angle between the second link and the third link of the robot; and
      whenever the angle matches the angle between the second link and the third link of the robot, determining that the candidate position provides a valid solution for the target pose.

15. The system of claim 14, wherein evaluating each candidate position and determining whether the angle matches the angle between the second link and the third link of the robot comprises:
   generating, for the plurality of candidate positions, a curve that represents the determined angle for each candidate position;
   determining one or more points on the curve that cross a line that represents the link angle; and
   determining that the candidate position for each point provides a valid solution for the target pose.

16. The system of claim 13, wherein determining, for a third joint that connects the third link to a fourth link, one or more positions of the third joint based on the candidate position and a position of one or more other joints of the robot comprises:
   determining a fourth target position of a fourth joint that also connects the third link to the fourth link; and
   determining a fifth target position of a fifth joint that connects the fourth link to a fifth link of the robot, wherein the fourth target position of the fourth joint is determined based on the fifth target position of a fifth joint,
   wherein the one or more other joints comprises the fourth joint and the fifth joint.

17. A non-transitory computer storage medium encoded with a computer program, the program comprising instructions that when executed by one or more data processing apparatus of a robot cause the data processing apparatus to perform operations comprising:
   receiving pose data defining a target pose for an end effector of a robot having a wrist offset, the pose data specifying a target end effector position for the end effector and a target orientation of the end effector, the end effector being attached to a first end of a first link of the robot;
   determining, based on the pose data, a first target position of a first point located at the first end of the first link;
   determining, based on the pose data, a second target position of a first joint connecting the first link to a second link, the first joint being located at (i) a second end of the first link opposite the first end and (ii) a first end of the second link, wherein the first link and the second link form an offset wrist connected to a first end of a third link of the robot;
   determining a third target position of a second joint located at the first end of the third link, including:
      defining a first plane (i) that includes the second target position of the first joint and (ii) for which a line between the first target position of the first point and the second target position of the first joint is a normal to the first plane;
      determining, based at least on a distance between the first joint and the second joint, a position and size of a circle (i) that lies within a second plane that is parallel to the first plane and (ii) that is located at an offset position from the first plane; and
      selecting, as the third target position of the second joint, a point on a perimeter of the circle; and
   providing, to a control system of the robot and based on each target position for each joint, movement data that causes the control system to adjust links of the robot such that each joint is located at the target position for the joint and the end effector is located at the target end effector position and in the target orientation for the end effector.

18. The non-transitory computer storage medium of claim 17, wherein determining the position and size of the circle comprises determining an offset distance between the first plane and the second plane based on the distance between the first joint and the second joint and an angle between the first link and the second link.

19. The non-transitory computer storage medium of claim 17, wherein determining the position and size of the circle comprises determining a radius of the circle based on the distance between the first joint and the second joint and an angle between the first link and the second link.

20. The non-transitory computer storage medium of claim 17, wherein the circle has a center that is on the line between the first target position of the first point and the second target position of the first joint.

* * * * *